US011088375B2

(12) United States Patent
Lee et al.

(10) Patent No.: US 11,088,375 B2
(45) Date of Patent: Aug. 10, 2021

(54) FUEL CELL PURGING METHOD

(71) Applicants: Hyundai Motor Company, Seoul (KR); Kia Motors Corporation, Seoul (KR)

(72) Inventors: Hyun Jae Lee, Seoul (KR); Jong Hyun Lee, Gyeonggi-do (KR); Deuk Kuen Ahn, Gyeonggi-Do (KR); Yei Sik Jeon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/712,327

(22) Filed: Dec. 12, 2019

(65) Prior Publication Data

US 2020/0119376 A1    Apr. 16, 2020

Related U.S. Application Data

(62) Division of application No. 14/938,374, filed on Nov. 11, 2015, now Pat. No. 10,541,436.

(30) Foreign Application Priority Data

May 27, 2015 (KR) .................. 10-2015-0073898

(51) Int. Cl.
*H01M 8/04223* (2016.01)
*H01M 8/04225* (2016.01)
*H01M 8/04228* (2016.01)
*H01M 8/04302* (2016.01)
*H01M 8/04303* (2016.01)
(Continued)

(52) U.S. Cl.
CPC ......... *H01M 8/04231* (2013.01); *B60L 58/32* (2019.02); *H01M 8/04228* (2016.02); *H01M 8/04238* (2013.01); *H01M 8/04303* (2016.02); *H01M 8/04388* (2013.01); *H01M 2250/20* (2013.01); *Y02T 90/40* (2013.01)

(58) Field of Classification Search
CPC ......... H01M 8/04955; H01M 8/04223; H01M 8/04402; H01M 8/04388; H01M 8/04746–04761
See application file for complete search history.

(56) References Cited

U.S. PATENT DOCUMENTS

| 5,860,932 A | 1/1999 | Goto et al. |
| 9,130,202 B2 | 9/2015 | Matsumoto et al. |
| (Continued) | | |

FOREIGN PATENT DOCUMENTS

| JP | 2002-093448 A | 3/2002 |
| JP | 2005-267937 A | 9/2005 |
| (Continued) | | |

Primary Examiner — Stephan J Essex
(74) Attorney, Agent, or Firm — Mintz Levin Cohn Ferris Glovsky and Popeo, P.C.; Peter F. Corless

(57) ABSTRACT

A fuel cell purging method is provided to effectively prevent fuel cell deterioration and degradation of durability of the fuel cell by performing hydrogen purging at a point in time at which negative pressure of an anode peaks after a fuel cell vehicle is stopped. The fuel cell purging method includes stopping the driving of a fuel cell vehicle and continuously measuring pressure of an anode of a fuel cell after the fuel cell vehicle is stopped. Additionally, hydrogen is supplied to the anode when the measured pressure of the anode reaches a negative pressure peak time point.

8 Claims, 6 Drawing Sheets

(51) Int. Cl.
  *H01M 8/0438*   (2016.01)
  *H01M 8/04746*  (2016.01)
  *H01M 8/04955*  (2016.01)
  *B60L 58/32*    (2019.01)

(56)            References Cited

U.S. PATENT DOCUMENTS

2011/0151347 A1   6/2011   Araki
2012/0251910 A1   10/2012  Matsumoto et al.
2013/0344410 A1   12/2013  Son et al.

FOREIGN PATENT DOCUMENTS

JP   2006-012479 A   1/2006
JP   2009-078969 A   4/2009
JP   2012-212617 A   11/2012
KR   10-1007153 B1   1/2011
KR   2011-0019274 A  2/2011
KR   20120061282 A   6/2012
KR   2013-0142572 A  12/2013

FUEL CELL PURGING METHOD

CROSS-REFERENCE TO RELATED APPLICATION

This application is a divisional of U.S. application Ser. No. 14/938,374, filed Nov. 11, 2015, which is based on and claims the benefit of priority to Korean Patent Application No. 10-2015-0073898, filed on May 27, 2015, in the Korean Intellectual Property Office, the disclosure of which is incorporated herein in its entirety by reference.

TECHNICAL FIELD

The present disclosure relates to a fuel cell purging method for preventing a deterioration of a fuel cell during a period of time from a point at which a fuel cell vehicle is stopped to a point at which the fuel cell vehicle is restarted, and more particularly, to a fuel cell purging method capable of effectively preventing deterioration of a fuel cell and degradation of durability of the fuel cell by performing hydrogen purging when negative pressure of an anode peaks after a halt of a fuel cell vehicle.

BACKGROUND

A fuel cell may be divided into a fuel cell stack configured to generate electric energy, a fuel supply system configured to supply fuel (e.g., hydrogen) to the fuel cell stack, an air supply system including an air blower and a humidifier to supply oxygen in the air, an oxidizing agent, required for an electrochemical reaction to the fuel cell stack, and a heat and water management system configured to adjust an operation temperature of the fuel cell stack.

Recently, fuel cell vehicles equipped with fuel cells as a driving source of vehicles have been released and development of eco-friendly future vehicles has been ongoing. A fuel cell is a type of electricity generation device for generating electricity as a main energy source of fuel cell vehicles, having a structure in which an anode to which hydrogen is supplied and a cathode to which air is supplied are stacked with a membrane electrode assembly (MEA) interposed therebetween and oxygen in the air and hydrogen supplied from the exterior are chemically reacted to generate electric energy.

Thus, while the fuel cell is operated, hydrogen having high purity is supplied to the anode of the fuel cell and air in the air is simultaneously directly supplied to the cathode of the fuel cell using an air supply device such as an air blower to generate electric energy. Accordingly, hydrogen supplied to the fuel cell is separated into hydrogen ions and electrons in a catalyst of the anode, and the separated hydrogen ions are transferred to the cathode through the electrolyte membrane, and oxygen supplied to the cathode is bonded with electrons introduced to the cathode through an external conducting wire to produce water, thus generating electric energy.

The generated electric energy is used in a driving motor of a fuel cell vehicle while is equipped with the fuel cell drives. When the fuel cell vehicle is stopped and a parking state thereof is maintained for a predetermined period of time, the fuel cell is shut down and supply of air and hydrogen to the fuel cell is stopped. When the parking state of the fuel cell vehicle is maintained for a long period of time, hydrogen remaining in the anode passes through an electrolyte membrane to be transferred to the cathode, rendering pressure of the anode to be less than the cathode, which results in formation of negative pressure in the anode whose entrance and exit are blocked. Due to the negative pressure of the anode, a nitrogen component within the cathode is introduced to the anode, and thus, pressure of the anode is recovered to normal pressure.

As illustrated in FIG. 1, in the process of forming negative pressure and recovering normal pressure of the anode, as the anode is reduced, negative pressure rapidly proceeds, and the pressure is gradually increased from a point of a negative pressure peak (please refer to "P" of FIG. 1) to be recovered to normal pressure. When the parking state of the fuel cell vehicle continues even thereafter, oxygen within the cathode is introduced to the anode, forming an interface between hydrogen and oxygen (e.g., $H_2$/air front) in the anode to cause deterioration of the fuel cell due to the $H_2$/air front.

In addition, when the fuel cell vehicle is parked for a substantial period of time, a gas other than hydrogen is mixedly introduced to the anode. Thus, when the fuel cell vehicle is restarted after the long-term parking, a high potential is formed to severely deteriorate the fuel cell to degrade durability of the fuel cell stack. Thus, to prevent a degradation of the fuel cell until the fuel cell vehicle, which has been parked for a substantial period of time, is restarted, a fuel cell purging method of periodically/aperiodically supplying hydrogen to the anode to exhaust oxygen within the fuel cell has been introduced.

However, with the fuel cell purging method, when the full cell is shut down and started up, hydrogen purging is performed, and when a parking time has lapsed, additional hydrogen purging is periodically performed, increasing hydrogen consumption to degrade actual fuel efficiency of the fuel cell vehicle. Among other methods for preventing degradation of a fuel cell is a start up cathode oxygen depletion (SU COD) scheme to reduce a potential of a stack by temporarily connecting a resistor when a high potential is detected when a vehicle is started. Here, hydrogen is additionally supplied to the anode.

However, the SU COD scheme has a high possibility of a fatal degradation of fuel cell performance due to a reverse voltage generated in a cell of a fuel cell stack when fuel is supplied unevenly. In addition, since hydrogen is additionally supplied, hydrogen consumption is increased to degrade actual fuel efficiency of the fuel cell vehicle.

SUMMARY

The present disclosure provides a fuel cell purging method capable of effectively preventing deterioration of a fuel cell and degradation of durability of the fuel cell, as well as significantly reducing hydrogen consumption, by performing hydrogen purging when negative pressure of an anode peaks after a fuel cell vehicle is stopped.

According to an exemplary embodiment of the present disclosure, a fuel cell purging method may include: stopping driving of a fuel cell vehicle; measuring a pressure of an anode of a fuel cell after the fuel cell vehicle is stopped; and supplying hydrogen to the anode when the measured pressure of the anode reaches a negative pressure peak time point.

In the anode pressure measurement, pressure of the anode may be continually measured at a predetermined time interval as time elapses after the fuel cell vehicle is stopped to thereby calculate current pressure of the anode measured at a current point in time and previous pressure of the anode measured previously before the current point in time.

The fuel cell purging method may further include: calculating a pressure difference value by subtracting the previous pressure of the anode from the current pressure of the anode; and determining whether the pressure difference value is greater than or equal to about 0, wherein when the pressure difference value is greater than or equal to about 0 in the pressure difference value determination operation, it may be determined that pressure of the anode has reached the negative pressure peak time point.

Further, based on a point in time at which pressure of the anode is measured, a slope before the measurement time point and a slope after the measurement time point may be multiplied, and when a value obtained by multiplying the slopes is a negative value, it may be determined that pressure of the anode has reached the negative pressure peak time point.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
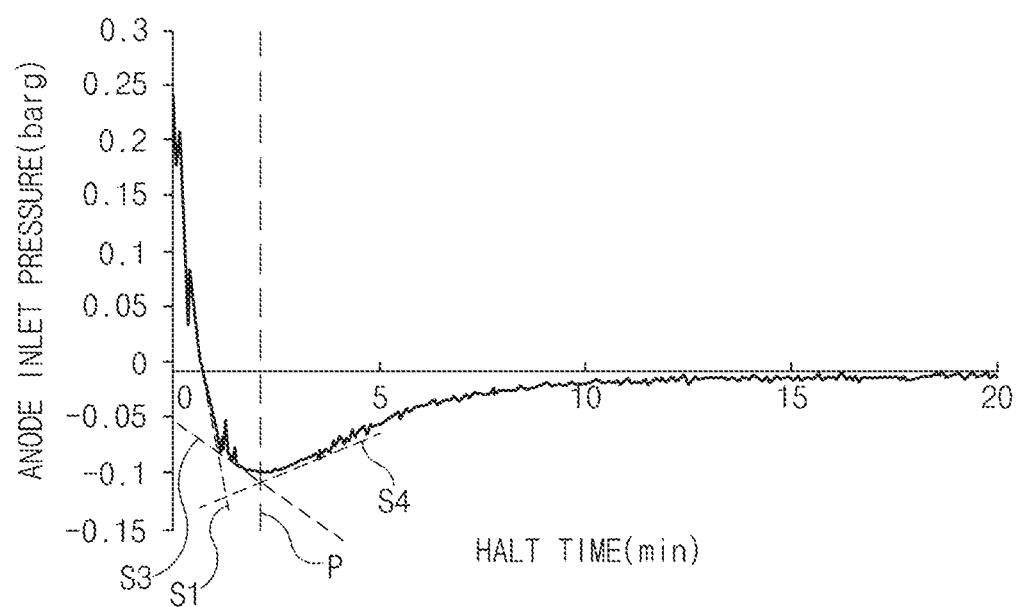
FIG. 1 is a graph illustrating a change in pressure of an anode of a fuel cell over the lapse of time until a general fuel cell vehicle in a halt state (a fuel cell is shut down) is started according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiment of the present disclosure will be described in detail with reference to the accompanying drawings. For reference, dimensions of elements or thicknesses of lines illustrated in the drawings referred to describe the present disclosure may be exaggerated for the convenience of understanding. Also, the terms used henceforth have been defined in consideration of the functions of the present disclosure, and may be altered according to the intent of a user or operator, or conventional practice. Therefore, the terms should be defined based on the entire content of this specification.

Figure 2:
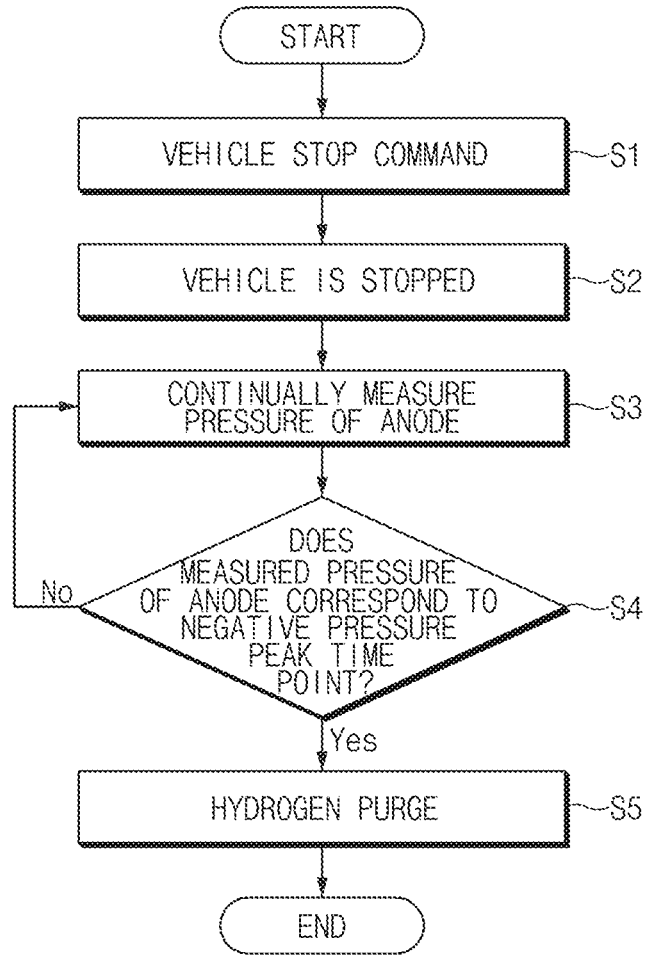
FIG. 2 is a flow chart illustrating a fuel cell purging method according to an exemplary embodiment of the present disclosure.

FIG. 2 is a flow chart illustrating a fuel cell purging method according to an exemplary embodiment of the present disclosure. The various methods discussed herein below are understood to be executed by a controller having a processor and a memory. In particular, as illustrated in FIG. 2, when driving of a fuel cell vehicle equipped with a fuel cell is intended to be stopped, a controller such as an electronic control unit (ECU), or the like, may be configured to output a stop command for the fuel cell vehicle in operation S1, and the fuel cell vehicle may be stopped based on the stop command in operation S2. When the fuel cell vehicle is stopped, the fuel cell may be shut down.

When the halt of the fuel cell vehicle and the shutdown of the fuel cell are maintained (e.g., when a parked state of the fuel cell vehicle is maintained), pressure of an anode of the fuel cell may be measured continuously at a predetermined time interval in operation S3. The controller may be configured to determine whether the measured pressure of the anode reaches a time point of a negative pressure peak in operation S4. A detailed exemplary embodiment of the anode pressure measurement operation (S3) and the negative pressure peak determination operation (S4) will be described hereinafter with reference to FIG. 3.

Figure 3:
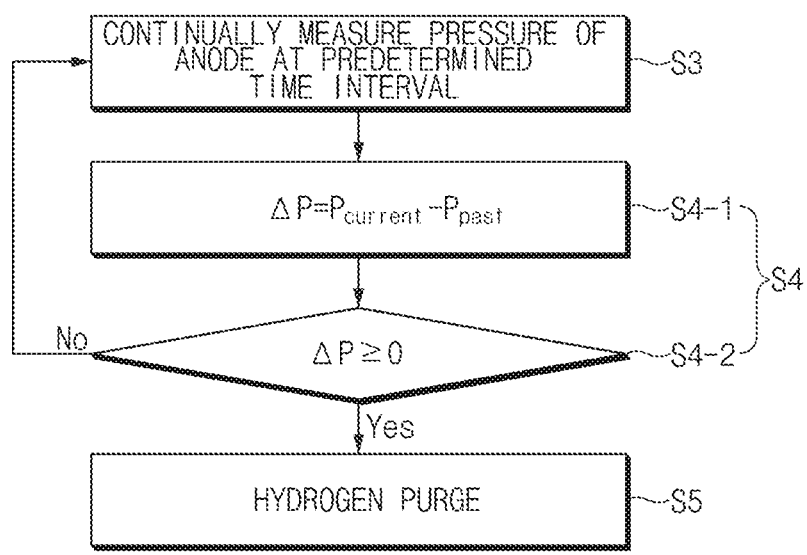
FIG. 3 is a flow chart illustrating an operation of measuring pressure of an anode and an operation of determining a peak of negative pressure in the fuel cell purging method according to an exemplary embodiment of the present disclosure.

As illustrated in FIG. 3, pressure of the anode may be continuously measured at a predetermined time interval dT, whereby the current pressure $P_{current}$ of the anode measured at the current point in time and a previous pressure $P_{past}$ of the anode measured before the time interval dT from the current point in time may be calculated in operation S3.

The previous pressure $P_{past}$ of the anode may be subtracted from the current pressure $P_{current}$ of the anode to calculate a pressure difference value ($\Delta P = P_{current} - P_{past}$) in operation S4-1, and the controller may be configured to determine whether the calculated pressure difference value is greater than or equal to about 0. When the pressure difference value is greater than or equal to about 0, the controller may be configured to determine that the pressure has reached the negative pressure peak (P) time point in operation S4-2. In other words, when the current pressure $P_{current}$ of the anode is greater than or equal to the previous pressure $P_{past}$ of the anode, the controller may be configured to determine that pressure of the anode has reached the negative pressure peak (P) time point.

Particularly, a process in which pressure of the anode reaches the negative pressure peak (P) time point will be described in detail with reference to FIG. 1. Pressure of the anode is rapidly reduced (please refer to a negative slope S1 of FIG. 1) with the passage of time after the shutdown of the fuel cell to reach the negative pressure peak (P). After the pressure of the anode reaches the negative pressure peak (P), nitrogen (or oxygen) is introduced into a cathode, and accordingly, pressure of the anode may be gradually increased (please refer to a positive slope S4 of FIG. 1) and recovered to normal pressure.

According to an alternative exemplary embodiment, when the pressure difference value ΔP is within a range close to 0, that is, when the pressure difference value ΔP is within a range slightly less than or greater than 0 (e.g., −0.01<ΔP<0.01), the controller may be configured to determine that pressure of the anode has reached the negative pressure peak (P). Accordingly, based on a point in time at which pressure of the anode is measured, a slope before the measurement time point and a slope after the measurement time point may be multiplied once or more, and thereafter, when a value obtained by multiplying the slopes has a negative value, the controller may be configured to determine that a pressure difference value ΔP is about 0 and that pressure of the anode at the measurement time point has reached the negative pressure peak (P) time point. In particular, referring to FIG. 1, when pressure of the anode reaches the negative pressure peak (P) time point, a slope before the negative pressure peak (P) time point is a negative slope (S3) and a slope after the negative pressure peak (P) is a positive slope (S4), and thus, when the negative slope value (S3) and the positive slope value (S4) are multiplied, a negative value may be calculated, based on which, it may be seen that the pressure difference value ΔP is about 0.

Figure 6:
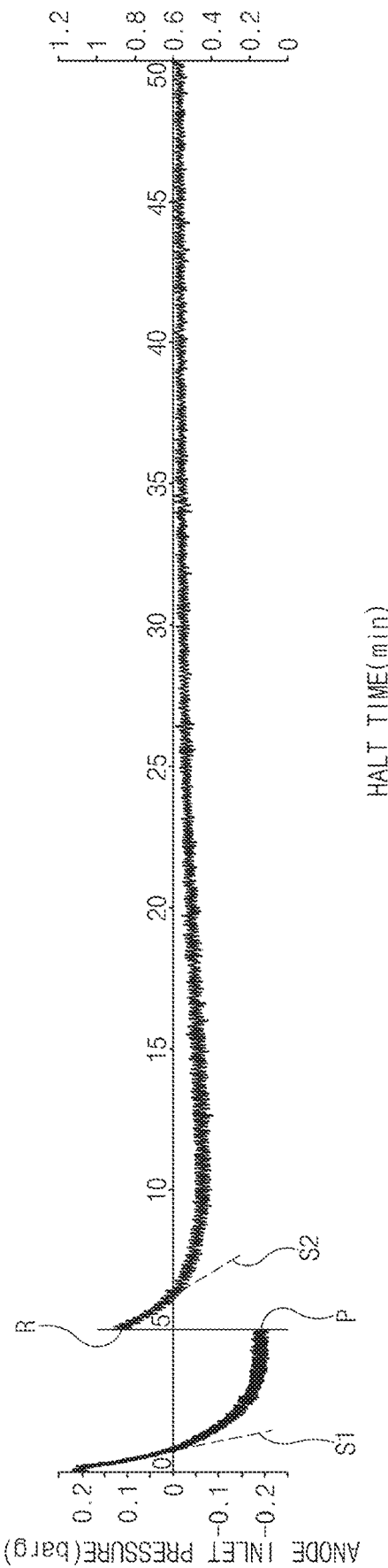
FIG. 6 is a graph illustrating a change in pressure of an anode of a fuel cell according to application of the fuel cell purging method according to the present disclosure.

In response to determining that pressure of the anode has reached the negative pressure peak (P) time point, hydrogen purging ($H_2$ Purge) may be performed to supply hydrogen to the anode in operation S5. When the hydrogen purging ($H_2$ Purge) is performed as pressure of the anode reaches the negative pressure peak (P) time point, pressure of the anode may be rapidly increased from the negative pressure state (P) to a positive pressure state (R) as illustrated in FIG. 6. In other words, since hydrogen purging may be performed at the negative pressure peak (P) time point, a state in which pressure of the anode becomes negative pressure may be minimized or avoided.

After the pressure of the anode is changed to positive pressure by the hydrogen purging, the pressure may be reduced, and the pressure may be gently reduced (please refer to the slope S2 of FIG. 6). In this manner, in the present disclosure, since hydrogen purging ($H_2$ Purge) may be advanced (e.g., continuously performed) after the shutdown of the fuel cell based on a halt of the fuel cell vehicle (e.g., the vehicle is stopped), compared to the related art, a phenomenon in which the anode of the fuel cell is adjusted to a negative pressure state may be minimized or avoided, and accordingly, introduction (crossover) of air from the cathode to the anode may be delayed or minimized. Additionally, deterioration of the fuel cell stack and a reduction in an amount of hydrogen due to a rapid hydrogen/oxygen reaction that may occur when the fuel cell is shut down may be effectively prevented.

In particular, in the present disclosure, since hydrogen purging ($H_2$ Purge) may be performed to supply hydrogen when pressure of the anode reaches the negative pressure peak after the shutdown of the fuel cell, pressure of the anode may be rapidly increased from the negative pressure to the positive pressure (please refer to R of FIG. 6), and after the pressure is increased to the positive pressure, the pressure may be reduced substantially, and thus, a period of additionally supplying hydrogen may be extended (e.g., increased, lengthened, etc.), compared to the related art. For example, compared to the related art in which hydrogen is supplied at a period of 12 hours after the shutdown of the fuel cell, in the present disclosure, hydrogen may be supplied at a period of about 24 hours.

Additionally, in the present disclosure, since hydrogen purging may be performed by supplying hydrogen at the negative pressure peak time point as illustrated in FIG. 2, shutdown of hydrogen purging is not required to be performed separately when the fuel cell is shut down, and thus, an amount of hydrogen consumption may be significantly reduced. Further, actual fuel efficiency of the fuel cell vehicle may be enhanced through the reduction in the amount of hydrogen consumption, thus considerably increasing a driving distance of the vehicle.

Figure 4:
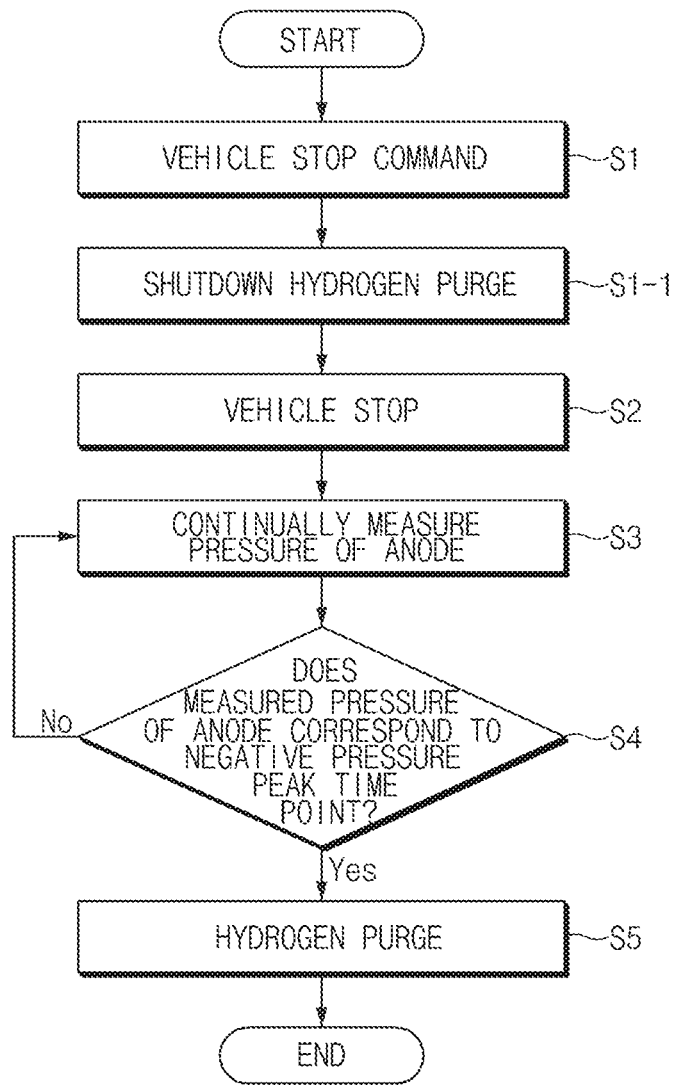
FIG. 4 is a flow chart illustrating a fuel cell purging method according to another exemplary embodiment of the present disclosure.

FIG. 4 is a flow chart illustrating a fuel cell purging method according to another exemplary embodiment of the present disclosure. As illustrated in FIG. 4, when the fuel cell vehicle equipped with the fuel cell is desired to be stopped from driving, a controller such as an ECU may be configured to output a stop command for the fuel cell vehicle in operation S1, and after the stop command, shutdown hydrogen purging (shutdown $H_2$ purge) may be executed to supply hydrogen to the anode of the fuel cell in operation S1-1. After the shutdown hydrogen purging, the fuel cell vehicle may be stopped according to the stop command in operation S2. When the fuel cell vehicle is stopped, the fuel cell may be shut down. According to an alternative exemplary embodiment, shutdown hydrogen purging (shutdown $H_2$ purge) may be performed after the fuel cell is shut down.

According to the exemplary embodiment of FIG. 4, by performing shutdown hydrogen purging (shutdown $H_2$ purge) in advance before or after the shutdown of the fuel cell, a phenomenon in which pressure of the anode becomes negative pressure may be further avoided or minimized, and thus, a deterioration of the fuel cell may be further effectively prevented. In the exemplary embodiment of FIG. 4, an amount of hydrogen consumption may be slightly increased since hydrogen may be supplied to the anode before and after the shutdown of the fuel cell, compared with the exemplary embodiment of FIG. 2. Nonetheless, since the amount of hydrogen consumption may be significantly reduced, compared to the related art, actual fuel efficiency of the fuel cell vehicle may be enhanced.

Other remaining processes are similar to or the same as those of the exemplary embodiments of FIGS. 2 and 3 described above, and thus, a detailed description thereof will be omitted.

Figure 5:
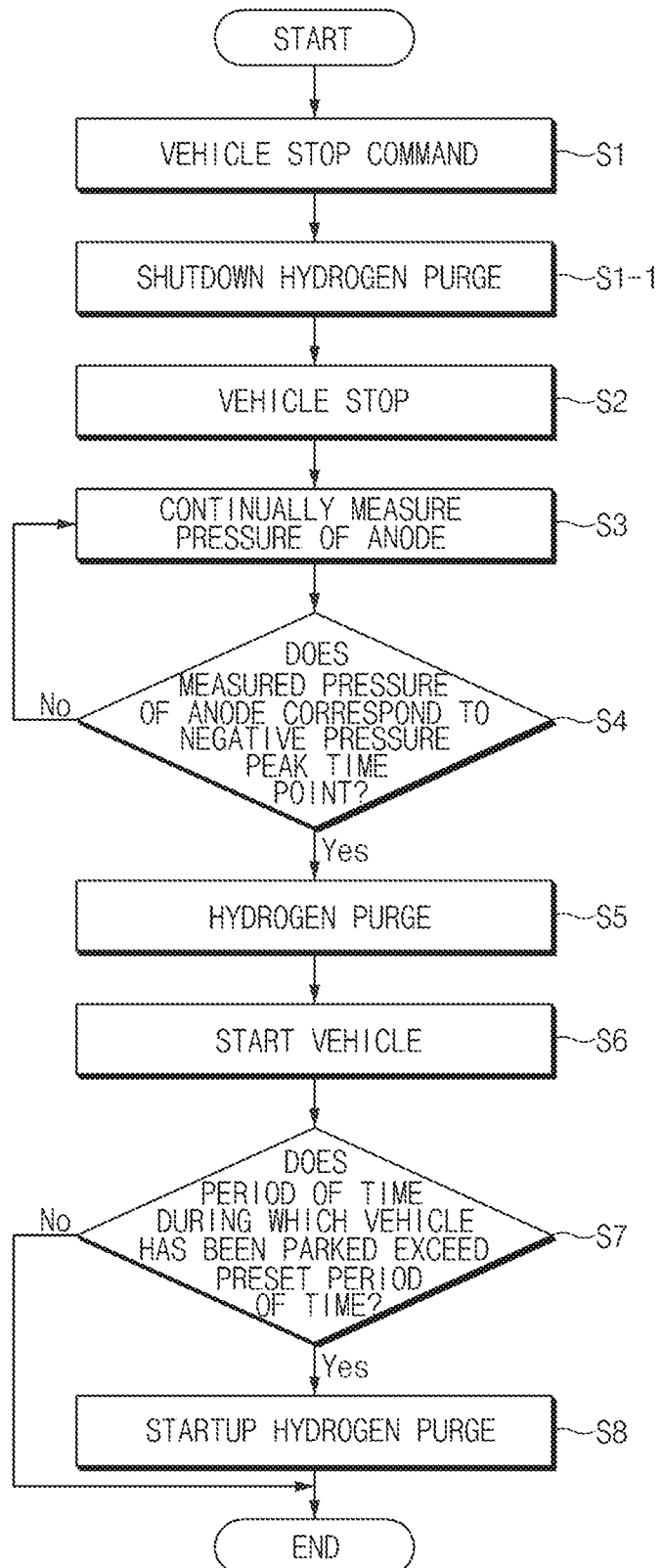
FIG. 5 is a flow chart illustrating a fuel cell purging method according to another exemplary embodiment of the present disclosure.

FIG. 5 is a flow chart illustrating a fuel cell purging method according to another exemplary embodiment of the present disclosure. The various steps of FIG. 5 may be executed by the controller. As illustrated in FIG. 5, the fuel cell vehicle may be re-started after the hydrogen purging (in operation S5) at the negative pressure peak time point in operation S6. Through the re-starting of the fuel cell vehicle, the fuel cell may be started up. After the re-starting of the fuel cell vehicle (in operation S6), the controller may be configured to determine whether a period of time during which the fuel cell vehicle has been parked exceeds a preset period of time (e.g., about 10 minutes) in operation S7.

The period of time during which the fuel cell vehicle has been parked may be counted or determined by a timer, and determining whether the period of time during which the fuel cell vehicle has been parked exceeds a preset period of time may include determining whether parking of the fuel cell vehicle is long-term parking or short-term parking. Thereafter, when the period of time during which the fuel cell vehicle has been parked exceeds the preset period of time, the controller may be configured to determine that the parking of the fuel cell vehicle is long-term parking, and execute startup hydrogen purging (startup $H_2$ purge) to additionally supply hydrogen to the anode of the fuel cell in operation S8.

In this manner, according to the exemplary embodiment of FIG. 5, at the time of startup of the fuel cell, when the period of time during which the fuel cell vehicle has been parked or a shutdown time of the fuel cell is within the preset period of time (e.g., for short-term parking), the startup hydrogen purging may not be executed, and when the period of time during which the fuel cell vehicle has been parked or a shutdown time of the fuel cell exceeds the preset period of time (e.g., for long-term parking), the startup hydrogen purging may be executed, whereby prevention of a deterioration of the fuel cell and a reduction in an amount of hydrogen consumption may be performed more stably. Operations S1 to S5 are similar to or the same as those of the previous exemplary embodiment, and thus, a detailed description thereof will be omitted.

As described above, according to the exemplary embodiments of the present disclosure, since hydrogen purging may be performed at a negative pressure peak time point of the anode after a halt of the fuel cell vehicle, an amount of hydrogen consumption may be significantly reduced and a deterioration of the fuel cell and a degradation of durability of the fuel cell may be effectively prevented. In particular, since the actual fuel efficiency of the fuel cell vehicle may be considerably enhanced through the reduction in the amount of hydrogen consumption, a driving distance of the vehicle may be significantly extended.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A fuel cell purging method, comprising:
   executing, by the controller, shutdown hydrogen purging before a fuel cell vehicle is stopped;
   shutting down, by the controller, a fuel cell of the fuel cell vehicle after the shutdown hydrogen purging;
   measuring, by the controller, pressure of an anode of the fuel cell after the fuel cell is shut down; and
   supplying, by the controller, hydrogen to the anode when the measured pressure of the anode reaches a negative pressure peak time point so that the pressure of the anode is increased from a negative pressure to a positive pressure while the fuel cell is shut down.

2. The fuel cell purging method according to claim 1, wherein, pressure of the anode is measured continuously at a predetermined time interval with the passage of time after the fuel cell vehicle is stopped to calculate current pressure of the anode measured at a current point in time and previous pressure of the anode measured previously before the current point in time.

3. The fuel cell purging method according to claim 2, further comprising:
   calculating, by the controller, a pressure difference value by subtracting the previous pressure of the anode from the current pressure of the anode; and
   determining, by the controller, whether the pressure difference value is greater than or equal to about 0,
   wherein when the pressure difference value is greater than or equal to about 0, pressure of the anode is determined to have reached the negative pressure peak time point.

4. The fuel cell purging method according to claim 2, wherein, based on a point in time at which pressure of the anode is measured, a slope before the measurement time point and a slope after the measurement time point are multiplied, and when a value obtained by multiplying the slopes is a negative value, pressure of the anode is determined to have reached the negative pressure peak time point.

5. The fuel cell purging method according to claim 1, further comprising:
   outputting, by the controller, a stop command for the fuel cell vehicle before the shutdown hydrogen purging; and
   stopping, by the controller, the fuel cell vehicle based on the stop command after the shutdown hydrogen purging.

6. The fuel cell purging method according to claim 1, further comprising:
   starting, by the controller, the fuel cell vehicle after the hydrogen purging;
   determining, by the controller, whether a period of time during which the fuel cell vehicle is parked exceeds a preset period of time; and
   executing, by the controller, startup hydrogen purging when the period of time during which the fuel cell vehicle is parked exceeds the preset period of time.

7. A fuel cell purging method, comprising:
   executing, by the controller, shutdown hydrogen purging before a fuel cell is shut down;
   continuously measuring, by the controller, pressure of an anode of the fuel cell after the shutdown hydrogen purging; and
   supplying, by the controller, hydrogen to the anode when the measured pressure of the anode reaches a negative pressure peak time point so that the pressure of the anode is increased from a negative pressure to a positive pressure while the fuel cell is shut down.

8. The fuel cell purging method according to claim 7, further comprising:
   starting, by the controller, a fuel cell vehicle after the hydrogen purging; and
   executing, by the controller, startup hydrogen purging when a period of time during which the fuel cell vehicle is parked exceeds a preset period of time.

* * * * *